(12) United States Patent
Takahama et al.

(10) Patent No.: US 6,453,771 B1
(45) Date of Patent: Sep. 24, 2002

(54) BICYCLE PEDAL

(75) Inventors: Kimitaka Takahama, Osaka (JP); Yutaka Ueda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/318,862

(22) Filed: May 26, 1999

(51) Int. Cl.$^7$ .............................................. G05G 1/14
(52) U.S. Cl. ................................. 74/594.6; 74/594.4
(58) Field of Search ........................... 74/594.4, 594.6; 36/131, 132; D12/125

(56) References Cited

U.S. PATENT DOCUMENTS

| | | | | |
|---|---|---|---|---|
| 4,836,047 A | * | 6/1989 | Alcamo | 74/594.6 |
| 6,085,614 A | * | 6/1989 | Lin | 36/131 X |
| 4,873,890 A | * | 10/1989 | Nagano | 74/594.4 |
| 5,778,739 A | * | 7/1998 | Takahama | 74/594.6 |
| 5,784,930 A | | 7/1998 | Ueda | 74/594.6 |
| 5,784,931 A | | 7/1998 | Ueda | 74/594.6 |
| 5,787,764 A | * | 8/1998 | Peyre | 74/594.6 |
| 5,992,266 A | * | 11/1999 | Heim | D12/125 X |

FOREIGN PATENT DOCUMENTS

| | | | | |
|---|---|---|---|---|
| JP | 11-263280 | * | 9/1999 | 74/594.6 |

OTHER PUBLICATIONS

SHIMANO® Bicycle Components; SHIMANO® Pure is Good; Three Catalog Pages; vol. 99; Issued 1998.

* cited by examiner

*Primary Examiner*—Vinh T. Luong
(74) *Attorney, Agent, or Firm*—Shinjyu Global IP Counselors, LLP (57) ABSTRACT

A bicycle pedal is provided with a pedal shaft or spindle, a pedal body with at least one cleat engagement mechanism and a tread cage supporting a rider's foot for attaching a shoe thereto via a cleat. The bicycle pedal body and the tread cage are coupled together for rotation about the pedal shaft or spindle. The tread cage is at least partially constructed of a resilient material to allow deflection of the tread cage relative to the pedal body. The tread cage has a tread surface that is at least partially located above the cleat engagement mechanism such that the tread cage must be deformed for complete engagement of the cleat with the cleat engagement mechanism. In other words, the resilient material of the tread cage permits limited angular rotation between the pedal body and the cage such that the tread surface contacts the shoe of the shoe when the cleat is in complete engagement with the cleat engagement mechanism. Preferably, the pedal body has cleat engagement mechanism coupled to each side for releasably retaining a cleat of a bicycle shoe therein.

17 Claims, 5 Drawing Sheets

BICYCLE PEDAL

BACKGROUND OF THE INVENTION

1. Field of the Invention

This invention generally relates to a bicycle pedal. More specifically, the present invention relates to a clipless or step-in bicycle pedal having a tread cage.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. Road racing pedals, on the other hand, typically only has a cleat engagement mechanism on one side of the pedal body. In either case, in this type of bicycle pedal, the rider steps onto the pedal and the cleat engagement mechanism automatically grips on to the cleat secured to the bottom of the cyclist's shoe.

When attaching the cyclist's shoe to the step-in or clipless pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

With this type of step-in or clipless pedal, the shoe and the pedal are in a state of constant engagement when the cleat clamping is engaged in the cleat clamping members, so the pedaling force can be transmitted efficiently to the pedals. As a result, step-in or clipless pedals are widely employed on racing bicycles used in road racing and mountain bike racing.

One problem with most step-in or clipless pedals is that they are quite small such that only small portions of the pedal body engage the rider's shoe. Specifically, the pedal body has a tread surface located on both sides of the cleat engagement mechanism. This tread surface has only a small surface area because the pedal body is typically made as small as possible so that it will be lightweight. Thus, it is often difficult to apply a pedaling force when the cleat is not engaged.

Furthermore, with off-road racing the foot must be repeatedly taken off the pedal during cornering and replaced on the pedal after the corner has been exited. Unfortunately, since the racing is performed on unpaved roads, mud clings to the pedals and tends to clog the clamping members. Once the clamping members become clogged with mud, the cleat cannot be engaged in the clamping members, and the shoe cannot be attached to the pedal. Moreover, the mud often clogs the biasing mechanism such that the clamping members may not operate properly.

When a cleat cannot be engaged with the cleat engagement members because of mud clogging, or when the feet are frequently removed from the pedals, the rider must often step on the pedal without the cleat being engaged in the cleat engagement members. However, since the pedal body of the above-mentioned conventional clipless pedals has as small a volume as possible and has only a small tread surface, the foot would slip around to the left and right when the cleat was not engaged with the cleat engagement members. As a result, the pedaling force is not transmitted efficiently to the pedals, and the speed of the bicycle drops. Lower speed is a critical problem for a racer. Accordingly, when it is expected that the pedals will become clogged with mud or the shoes will be taken off and replaced on the pedals frequently in this type of off-road race, more and more riders are using ordinary double-sided pedals rather than clipless pedals. Such pedals have no cleat engagement members, but they provide a good grip to the shoes. However, in either case, the cyclist does not have an optimum apparatus for pedaling the bicycle.

For a clipless pedal to be usable in such muddy situations, it must be possible for the rider to firmly step on the pedal even when the cleat is not engaged with the cleat engagement members. One possible means for achieving this could be to provide a wide tread cage on the pedal around the outside of the cleat engagement members so that more tread surface can come into contact with the shoe sole. However, if a wide tread cage is provided around the outside of the cleat engagement members, then the tread cage will interfere with the shoe sole and get in the way when the cleat is being engaged with the cleat engagement members. This may result in difficulties in engagement of the cleat with the pedal. Consequently, when the shoe is inserted from a direction other than the engagement direction, it will be difficult to reengage the cleat with the cleat engagement members quickly even if there is no mud clogging or the like.

Accordingly, step-in pedals have been designed with tread cages that have a small range of pivotal movement between the tread cage and the pedal body. In such an arrangement, tread cage is biased relative to the pedal body by a torsion spring. These bicycle pedals are provided with front and rear cleat engaging members that are coupled to the pedal for engaging corresponding front and rear portions of the cleat. A tread cage having a relatively wide tread surface is coupled to the pedal for movement relative to at least one of the front cleat engaging members or rear cleat engaging members. The wide tread surface provides stable contact between the cycling shoe and the pedal when the cleat is disengaged from the cleat engaging members. The movable tread cage allows the tread surface to move away from the cleat engaging members so as not to interfere when the cyclist is in the process of engaging the cleat with the cleat engaging members. The torsion spring is coupled between the tread cage and the pedal body to hold the tread cage in the appropriate position. While these prior art step-in pedals work very well, the torsion spring can fail over an extended period of time. Moreover, the torsion spring increases the costs of manufacturing the pedal.

In these prior pedals, the tread cage is typically constructed of a hard rigid material such as a metal alloy or a hard plastic material. Since pedals with tread cages are typically used in off road riding or down hill racing, the pedal and tread cage are often subjected to rough conditions, e.g., being hit by rocks and the like. Tread cages that are constructed of hard rigid materials can often be damaged. Moreover, the hard rigid materials used in prior art tread caged do not provide optimum contact with the sole of the bicycle shoe.

In view of the above, there exists a need for a bicycle pedal which overcomes the above mentioned problems in the prior art. In view of the above, it is apparent that there exists a need for a step-in bicycle pedal which is relatively durable and relatively inexpensive to manufacture. This invention addresses these needs in the art, along with other needs, which will become apparent to those skilled in the art once given this disclosure.

SUMMARY OF THE INVENTION

One object of the present invention is to provide a step-in bicycle pedal with a tread cage that is constructed of a shock absorbing material.

Another object of the present invention is to provide a step-in bicycle pedal with a tread cage that has a relatively durable tread cage.

Another object of the present invention is to provide a step-in bicycle pedal with a tread cage that provides better contact between the tread cage and the sole of the shoe.

Another object of the present invention is to provide a step-in bicycle pedal with a tread cage that does not require a coiled spring between the tread cage and the pedal body.

Another object of the present invention is to provide a step-in bicycle pedal with a tread cage in which the connection between the tread cage and the pedal body is less prone to malfunction.

Another object of the present invention is to provide a step-in bicycle pedal with a tread cage that is relatively inexpensive to manufacture.

In the present invention, a pedaling force can be efficiently transmitted to the bicycle pedal even if the cleat is not engaged, but the cleat also can be engaged with ease.

The foregoing objects of the present invention can be attained by providing a bicycle pedal for attaching a shoe thereto via a cleat. The bicycle pedal of the present invention basically has a pedal spindle, a pedal body and a tread cage. The pedal spindle has a center longitudinal axis of rotation. The pedal body is rotatably coupled to the pedal spindle. The pedal body has a first cleat engagement mechanism coupled to a first side of the pedal body to fixedly couple the cleat within a first cleat receiving area formed by the first cleat engagement mechanism. The tread cage is non-rotatably coupled to the pedal body to rotate therewith about the pedal spindle. The tread cage has a first tread surface located on the first side of the pedal body. The tread cage is at least partially constructed of a resilient material to allow deflection of the tread cage relative to the pedal body.

In one embodiment of the present invention, the bicycle pedal for attachment to a cleat fixed to a bicycle shoe is provided with front and rear cleat engaging members that are coupled to the pedal for engaging corresponding front and rear portions of the cleat. A tread cage having a relatively wide tread surface is coupled to the pedal for movement relative to at least one of the front cleat engaging members or rear cleat engaging members. The wide tread surface provides stable contact between the cycling shoe and the pedal when the cleat is disengaged from the cleat engaging members. The deformable tread cage allows the tread surface to move away from the cleat engaging members allowing the cyclist to engage the cleat with the cleat engaging members.

In one embodiment of the present invention, the tread cage of the bicycle pedal must be deformed for the cleat to engage the cleat engagement mechanism of the pedal body. Preferably, the tread surface is at least partially located to overlie a portion of the first cleat receiving area of the first cleat engagement mechanism as viewed in a direction parallel to the center longitudinal axis of rotation. Thus, the tread cage must be elastically deformed for complete engagement of the cleat with the first cleat engagement mechanism, when the cleat is coupled to the bicycle shoe.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
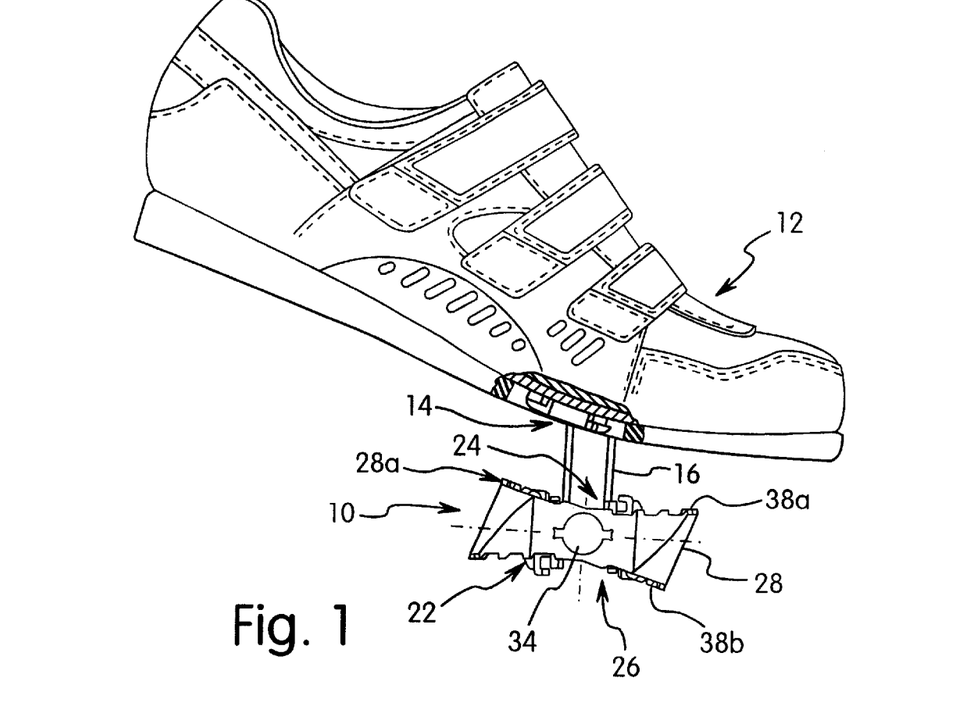
FIG. 1 is an outside elevational view of a bicycle shoe prior to being attached to a right bicycle pedal having a clipless pedal body and a tread cage in accordance with a first embodiment of the present invention and showing a first position of a rearward portion of the first tread surface of the tread cage prior to the angular deflection of the tread cage relative to the pedal body.

Referring initially to FIGS. 1 through 4, a bicycle pedal 10 is illustrated in accordance with the first embodiment of the present invention. Bicycle pedal 10 is a clipless or step-in pedal that can be used with a bicycle shoe 12 having a cleat 14 fixedly coupled thereto. Bicycle pedal 10 is especially designed for use with off-road bicycles as opposed to use with a road bicycle. Of course, bicycle pedal 10 can be used on a road bicycle or any type of bicycle if needed and/or desired. As seen in FIG. 1, bicycle pedal 10 is fixedly coupled to bicycle crank 16 of a bicycle for rotation therewith. The bicycle pedal 10 illustrated in the drawings is a right side pedal. Of course, the same pedal is provided on the left side of the bicycle (not shown), except that the left side pedal is the mirror image of the right side pedal 10. Thus, the description of the present invention will be made herein with reference to only one of the pedals, but of course, it will be apparent to those skilled in the art that the description of the right side pedal 10 applies to a left side pedal.

Figure 3:
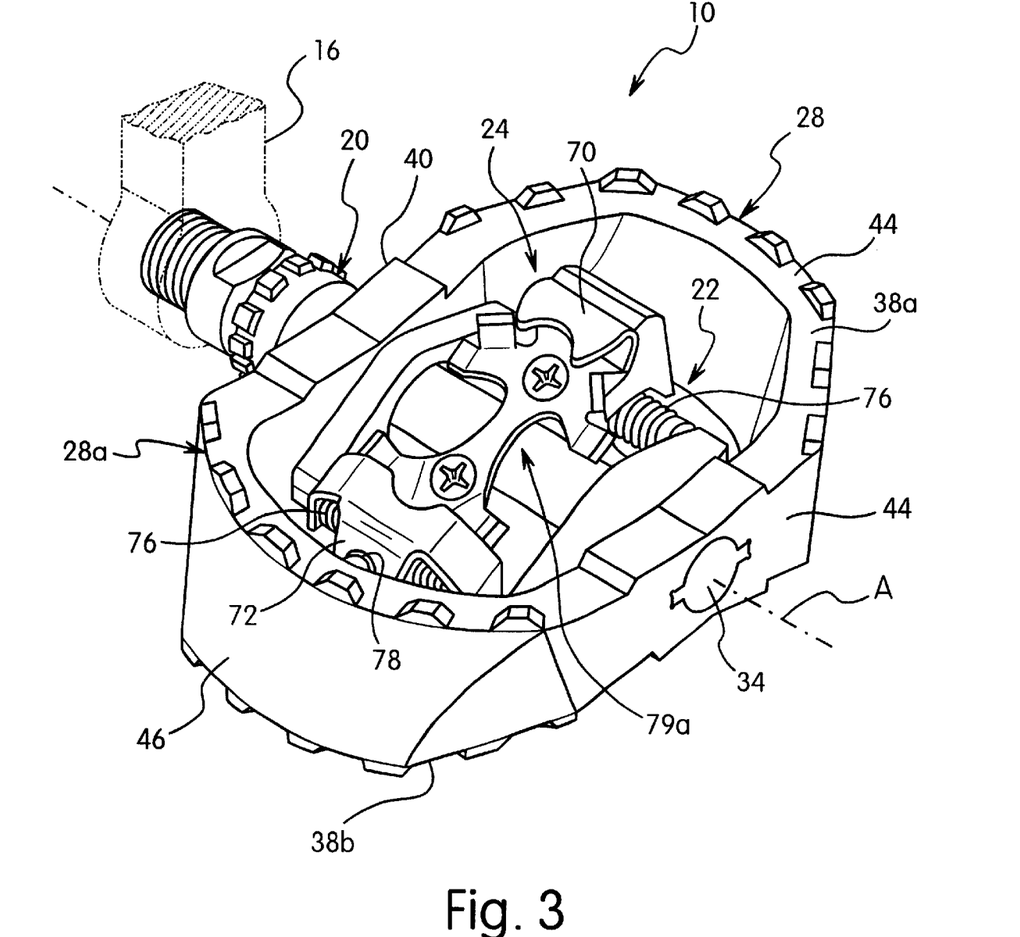
FIG. 3 is a top perspective view of the right bicycle pedal illustrated in FIGS. 1 and 2.

As best seen in FIGS. 3, 4, 8 and 9, bicycle pedal 10 basically includes a pedal shaft or spindle 20, a pedal body 22 with first and second cleat engagement mechanisms 24 and 26 and a tread cage 28 surrounding pedal body 22. First cleat engagement mechanism 24 is located on one (first) side 22a of pedal body 22 for selectively engaging cleat 14, while second cleat engagement mechanism 26 is located on the opposite (second) side 22b of pedal body 22 for selectively engaging cleat 14. As shown in FIGS. 1 and 3, pedal spindle 20 is fastened to crank 16 of a bicycle, with pedal body 22, and cage 28 being coupled together for rotation about longitudinal axis A of pedal spindle 20.

Figure 2:
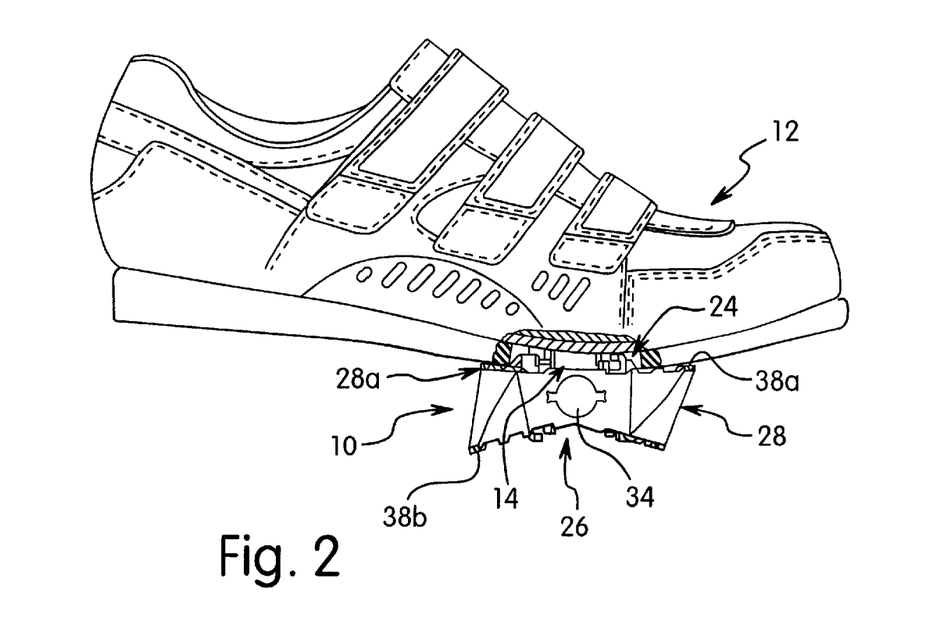
FIG. 2 is an outside elevational view of the right bicycle pedal illustrated in FIG. 1 after being attached to the cleat of the bicycle shoe and showing a second position of the rearward portion of the first tread surface of the tread cage after the angular deflection of the tread cage relative to the pedal body.

As seen in FIGS. 1 and 2, cleat 14 is fixedly attached to bicycle shoe 12 in a conventional manner. Cleat 14 is releasably attached to pedal body 22 via one of the cleat engagement mechanisms 24 or 26 in a conventional manner. Of course, the sole of bicycle shoe 12 can directly engage tread cage 28 without being coupled to one of the cleat engagement mechanisms 24 or 26. Tread cage 28 is positioned to completely surround pedal body 22, and is rotatably supported about pedal spindle 20 by pedal body 22, as discussed below.

Figure 5:
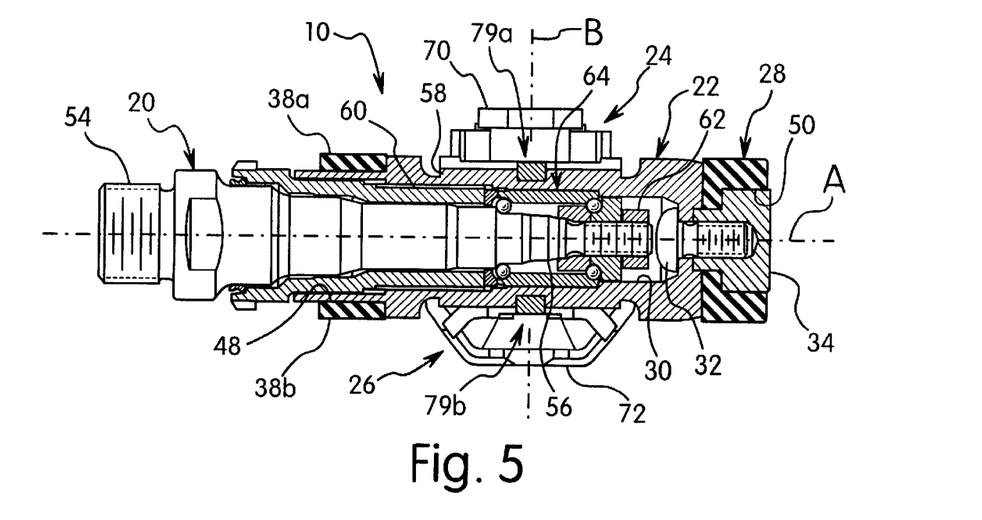
FIG. 5 is a transverse cross-sectional view of the right bicycle pedal illustrated in FIGS. 1 through 4 as seen along section line 5—5 of FIG. 4 and with the spindle shown in elevation.

As shown in FIG. 5, the pedal spindle 20 is a multi-step spindle having numerous stepped portions, which is received in a stepped bore 30 formed in pedal body 22. Pedal body 22 can freely rotate about the center longitudinal axis A of pedal spindle 20. As also seen in FIG. 5, pedal body 22 is fixedly coupled to tread cage 28 by a bolt 32 and a nut 34 to rotate therewith. More specifically, the thread shaft portion of bolt 32 extends through an opening at the end of bore 30 of pedal body 22 where it is threaded into nut 34. Nut 34 is non-rotatably coupled within a correspondingly shaped hole of tread cage 28. Nut 34 is preferably step shaped with a pair of detents or abutments 36 extending outwardly from the large portion of nut 34 to prevent relative rotational movement between tread cage 28 and nut 34.

Tread cage 28 is preferably molded as a one-piece, unitary member from a lightweight elastomeric material such as a rigid rubber material. The material of tread cage 28 should be sufficiently rigid to hold its shape (self-supporting). However, the material of tread cage 28 should also be somewhat flexible and resilient to allow elastic deformation to allow cleat 14 to engage one of the cleat engagement mechanisms 24 and 26. The tread cage 28 can be constructed of several types of materials so long as at least part of tread cage 28 is constructed of a resilient material to allow deflection of the tread cage relative to the pedal body. The bicycle pedal body 22 and the tread cage 28 are coupled together for rotation about the center longitudinal axis A of pedal spindle 20 by bolt 32 and nut 34 as mentioned above. The tread cage 28 completely surrounds pedal body 22. The tread cage 28 has first and second of oppositely facing tread surfaces 38a and 38b. The tread surfaces 38a and 38b are arranged at least partially above the cleat engagement mechanism 24 and 26 such that the tread cage 28 must be elastically deformed for complete engagement of the cleat 14 with one of the cleat engagement mechanisms 24 or 26. In other words, the resilient material of the tread cage 28 permits limited angular deflection D of the rearward portion 28a of the tread cage 28 relative to the pedal body 22 for complete engagement of the cleat 14 with one of the cleat engagement mechanisms 24 or 26. Thus, the rearward portion 28a of the tread cage 28 is arranged relative to the first side 22a of the pedal body 22 in a first position (FIGS. 1, 6 and 8) prior to the angular deflection D of the rearward portion 28a of the tread cage 28 relative to the pedal body 22. The rearward portion 28a of the tread cage 28 is arranged relative to the first side 22a of the pedal body 22 in a second position (FIGS. 2, 7 and 9) after the angular deflection D of the rearward portion 28a of the tread cage 28 relative to the pedal body 22. When the cleat 14 is engaged with one of the cleat engagement mechanisms 24 or 26 one of the tread surfaces 38a and 38b contacts the sole of the shoe 12.

Figure 4:
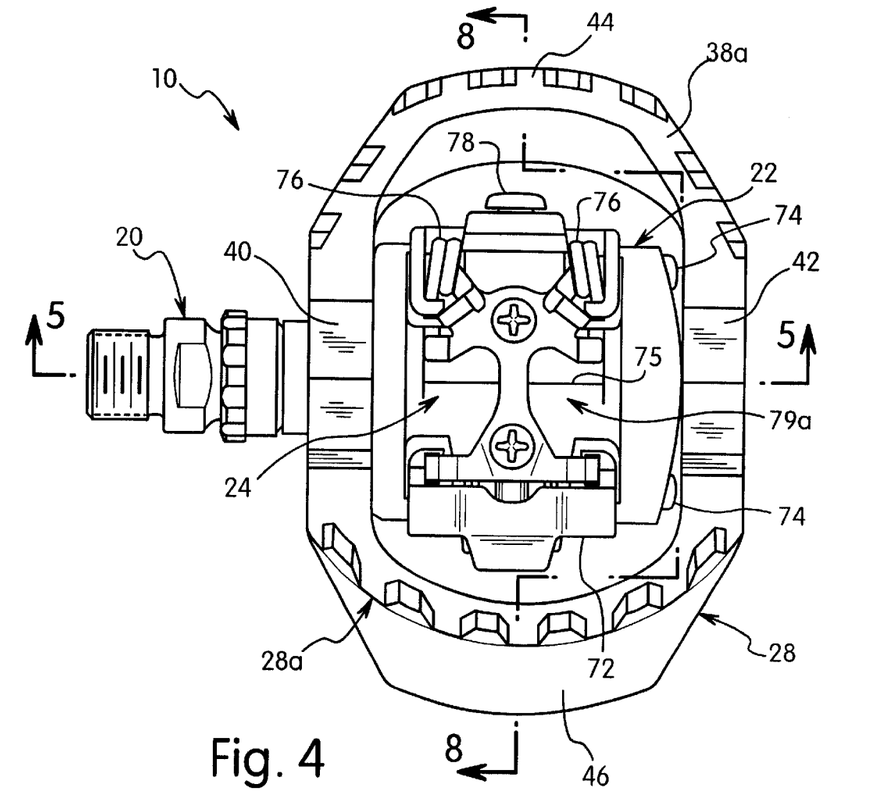
FIG. 4 is a top plan view of the right bicycle pedal illustrated in FIGS. 1 through 3.
Figure 6:
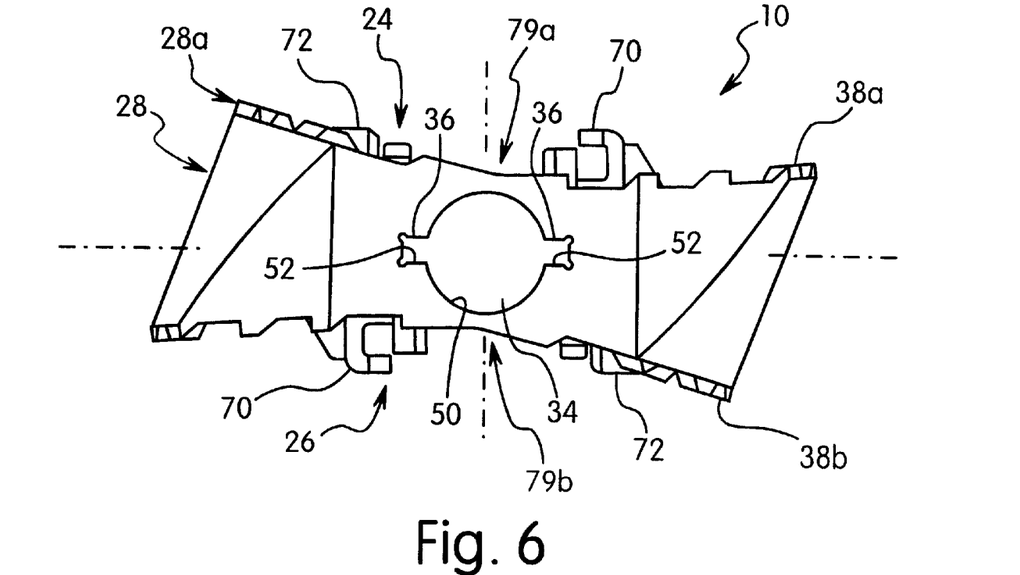
FIG. 6 is an outside elevational view of the right bicycle pedal illustrated in FIGS. 1 through 5 showing the first position of the rearward portion of the first tread surface of the tread cage prior to deformation of the tread cage relative to the pedal body.
Figure 7:
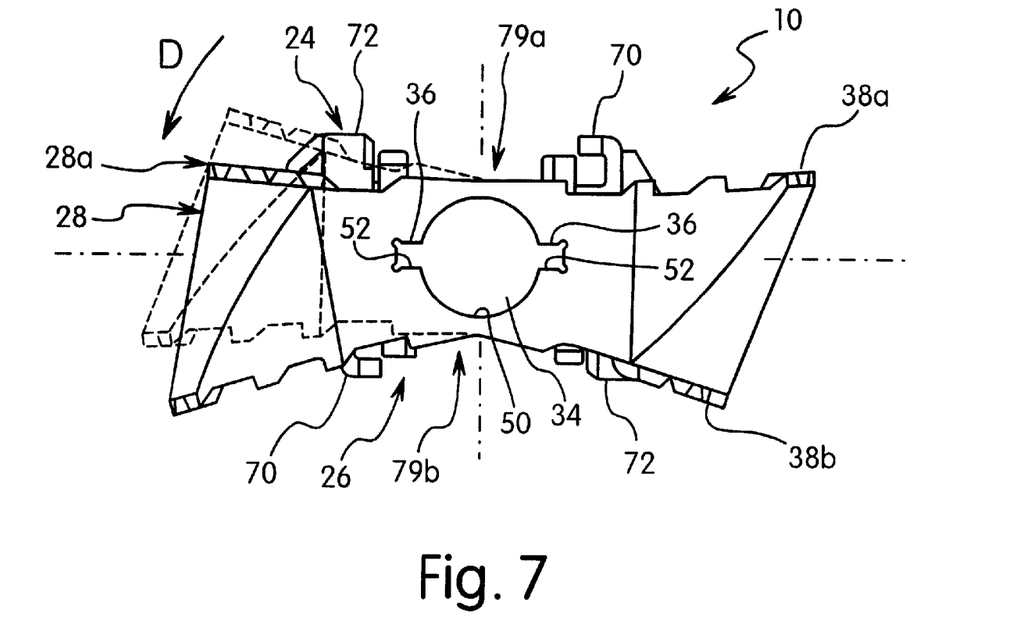
FIG. 7 is an outside elevational view, similar to FIG. 6, of the right bicycle pedal illustrated in FIGS. 1 through 6 showing the second position of the rearward portion of the first tread surface of the tread cage after approximately 12.5° deformation of the tread cage relative to the pedal body as measured about the center longitudinal axis A of the spindle.

As best seen in FIG. 4, tread cage 28 has a pair of parallel side sections 40 and 42, a pair of end sections 44 and 46. The frame of cage 28 is in the form of a compressed octagon or compressed oval. Side sections 40 and 42 are provided with openings 48 and 50, respectively, as seen in FIG. 5. Opening 48 receives a portion of spindle 20 therethrough, while opening 50 is shaped to receive nut 34 therein. Opening 50 is a step-shaped bore with a pair of opposed notches 52 formed in the larger portion of opening 50 as seen in FIGS. 5 and 6. These notches 52 receive abutments 36 of nut 34 to prevent relative rotation therebetween. When bolt 32 is firmly tightened within nut 34, pedal body 22 and tread cage 28 are squeezed together to prevent relative rotation therebetween.

Referring to FIG. 5, pedal spindle 20 has a first end 54 with threads formed thereon for fixedly coupling pedal 10 to crank 16 in a conventional manner. The other end 56 of pedal spindle 20 rotatably supports pedal body 22 and tread cage 28 about its longitudinal axis A. In particular, spindle 20 is secured within an outer tube 58 of pedal body 22 by an inner tube 60 and a lock nut 62 in a conventional manner. More specifically, end 56 of spindle 20 has threads formed thereon for threadedly receiving lock nut 58 that secures a bearing assembly 64 to the outer tube 58. Since these parts are relatively conventional parts and the specific constructions of these parts are not critical to the present invention, they will not be discussed in detail herein. Rather, these parts will only be discussed as necessary to understand the present invention.

Figure 8:
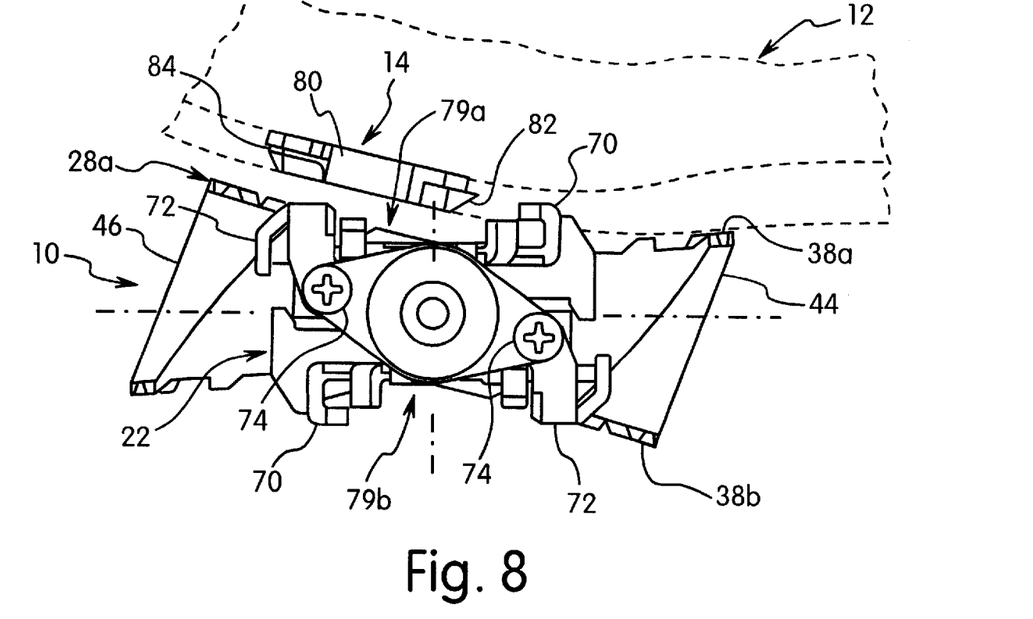
FIG. 8 is a cross-sectional view of the right bicycle pedal illustrated in FIGS. 1 through 7 as seen along section line 8—8 of FIG. 4 showing the first position of the rearward portion of the first tread surface of the tread cage prior to deformation of the tread cage relative to the pedal body.
Figure 9:
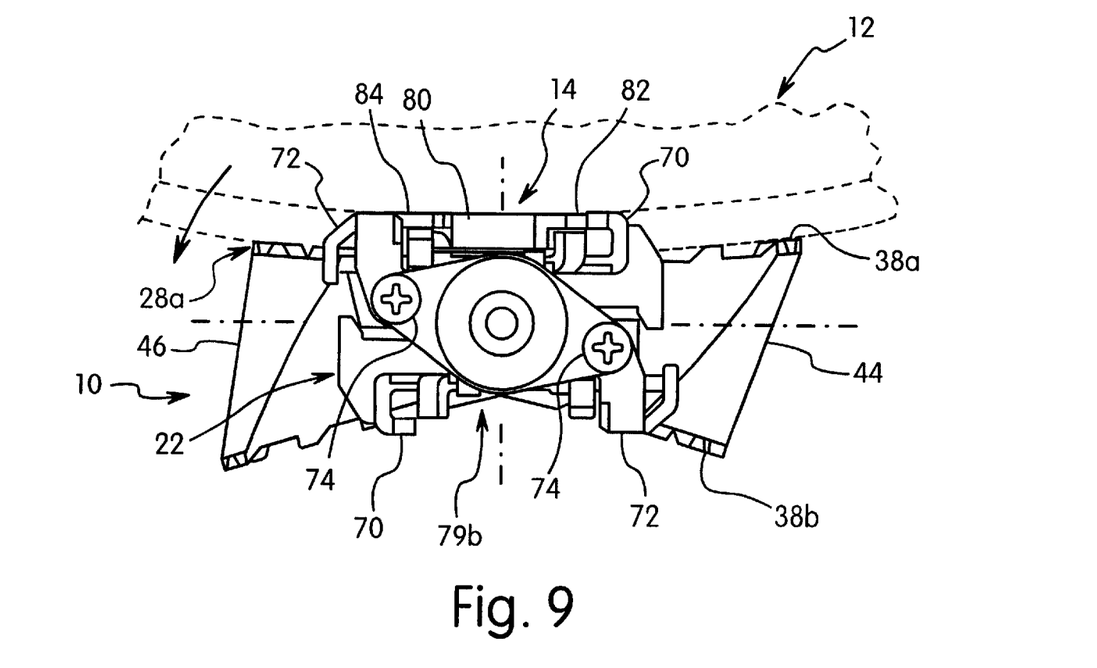
FIG. 9 is a cross-sectional view, similar to FIG. 8, of the right bicycle pedal illustrated in FIGS. 1 through 8 showing the second position of the rearward portion of the first tread surface of the tread cage after approximately 12.5° deformation of the tread cage relative to the pedal body as measured about the center longitudinal axis A of the spindle.

Preferably, cleat engagement mechanisms 24 and 26 are identical as best seen in FIGS. 8 and 9. Cleat engagement mechanisms 24 and 26 selectively engage cleat 14 of bicycle shoe 12 to attach the sole of a bicycle shoe 12 to pedal 10. Cleat engagement mechanisms 24 and 26 have a longitudinal center line or plane B extending between the front and the rear ends as seen in FIG. 3. Center line B of cleat engagement mechanisms 24 and 26 extends substantially perpendicular to center longitudinal axis A of pedal shaft 20.

Each of the cleat engagement mechanisms 24 has a front clamping member 70 that engages the front portion of cleat 14, and a rear clamping member 72 that engages the rear portion of cleat 14. In the illustrated embodiment, front clamping members 70 are stationary, while rear clamping members 72 are pivotally coupled to pedal body 22 by pivot pins 74. Cleat engagement mechanisms 24 and 26 are well known in the art, and thus will only be briefly discussed herein. Moreover, it will be apparent to those skilled in the art that most any step-in type of cleat engagement mechanism can be used with the present invention.

Referring to FIG. 4, front clamping member 70 is symmetrical to the left and right of the center line B of the cleat engagement mechanisms 24 and 26 of pedal 10. Front clamping member 70 is rigidly attached to the engagement fixing surface 75, and has a cleat clamping portion that curves out in a U-shape above the front of engagement fixing surface 75. Front clamping member 70 is unobstructed by the first tread surface 38a of tread cage 28 as viewed in a direction parallel to the center longitudinal axis A of rotation. This allows easy insertion of a front portion of the cleat 14 into front clamping member 70 without deformation of tread cage 28.

Referring to FIGS. 3 and 4, each of the rear clamping members 72 has a pair of biasing members 76 and a tension adjusting mechanism 78. Each rear clamping member 72 together with its respective pivot pin 74, biasing member 76 and tension adjusting mechanism 78 form a rear cleat engagement mechanism on one side of pedal body 22. The arrangement and structure of biasing members 76 and tension adjusting mechanisms 78 are conventional and well known in the art. Thus, these parts will not be discussed in detail herein.

Rear clamp member 72 is curved in a roughly inverted U-shape, with its two ends being swingably supported by pivot pin 74 (see FIGS. 7 and 8) that passes between the side portions of pedal body 22. Each biasing member 76 is preferably formed by a pair of torsion springs that are wound around the outside of the shaft of pivot pin 74 for biasing rear clamping member 72 to a cleat engaging or clamping position. More specifically, the torsion springs of biasing members 76 have their coiled portions mounted on pivot pins 74, with one end of each spring engaging a part of pedal body 22 and the other end of each spring engaging a part of tension adjusting mechanism 78. Biasing members 76 normally urge clamping members 72 to rotate about their respective pivot pins 74 from their cleat releasing positions to their cleat engaging or clamping positions. In other words, biasing members 76 normally maintain clamping members 72 in cleat engaging positions. The retaining forces of biasing members 76 on clamping members 72 are controlled by tension adjusting mechanisms 78. The tread surfaces 38a and 38b at least partially obstructs rear clamping members 72 as viewed in a direction parallel to the center longitudinal axis A of rotation. Thus, this arrangement requires the tread cage 28 to be elastically deformed for complete engagement of the cleat 14 with one of the rear clamping members 72.

Two cleat receiving areas 79a and 79b are formed on pedal body 22 for receiving and supporting cleat 14 thereon. More specifically, the first cleat receiving area 79a is defined by the space locate between clamping members 70 and 72 in which the cleat 14 is received on one side of pedal 10, while second cleat receiving area 79b is located on the other side of pedal 10. First and second clamping members 70 and 72 engage cleat 14 to releasably couple sole 18 of shoe 12 to bicycle pedal 10. Specifically, cleat 14 is engaged with pedal 10 by pressing cleat 14 into pedal 10 with a forward and downward motion. This releasably locks cleat 14 to pedal 10. Cleat 14 can be released from pedal 10 by twisting the heel of the shoe to the outside of pedal 10 as discussed below in more detail.

Referring again to FIGS. 8 and 9, bicycle shoe cleat 14 basically includes a center attachment portion 80, a first or front coupling portion 82 extending from one end of attachment portion 80 and a second or rear coupling portion 84 extending from the other end of attachment portion 80. Attachment portion 80 has an upper sole side facing in a first direction for engaging sole 18 of shoe 12 and a lower pedal side facing in a second direction which is substantially opposite to said first direction. Preferably attachment portion 80 and coupling portions 82 and 84 are integrally formed together as a one-piece, unitary member, which is constructed from a suitable rigid material. The interconnection of cleat 14 to the sole is relatively well known in the art, and thus, this interconnection will not be discussed or illustrated in detail herein.

Normally, tread cage 28 is set so that each front clamping member 70 is positioned above its respective tread surface 38a and 38b of cage 28, and each rear engagement member 72 is positioned below its respective tread surface 38a and 38b of cage 28. As a result, when the bicycle shoe 12 is placed on the pedal 10, the cleat 14 can be easily engaged with one of the front clamping members 70 without the shoe sole interfering with the cage 28. More specifically, tread cage 28 is at least partially constructed of a resilient material to allow deflection of tread cage 28 relative to cleat engagement mechanisms 24 and 26 for complete engagement of the cleat 14 with one of the cleat engagement mechanism 24 or 26. In other words, tread surfaces 38a and 38b are at least partially arranged to overlie a portion of the first cleat receiving area of the cleat engagement mechanisms 24 and 26 as viewed in a direction parallel to the center longitudinal axis of rotation A. Thus, the tread cage 28 must be elastically deformed for complete engagement of the cleat 14 with one of the cleat engagement mechanism 24 or 26. Preferably, tread cage 28 is elastically deformed at least five degrees as measured about the center longitudinal axis of rotation A for complete engagement of the cleat 14 with one of the cleat engagement mechanism 24 or 26. More preferably, tread cage 28 is elastically deformed at 12.5 degrees as measured about the center longitudinal axis of rotation A for complete engagement of the cleat 14 with one of the cleat engagement mechanism 24 or 26.

Operation of the pedal 10 will now be described with reference to FIGS. 8 and 9. When the shoe 12 is not attached to the pedal 10, as shown in FIG. 8, the front clamping members 70 of pedal body 22 are positioned above the tread surfaces 38a and 38b of cage 28, while the rear clamping members 72 are positioned below the cage 28. When bicycle shoe 12 is to be attached to the pedal 10, the tip of the shoe sole is moved forward toward front clamping member 70 so that the tip or front coupling portion 82 of cleat 14 is inserted into one of the front clamping members 70. In this state, each front clamping member 70 is positioned above its respective tread surface 38a and 38b of the cage 28. Thus, the cage 28 does not get in the way of the tip or front coupling portion 82 of cleat 14 being inserted into the front clamping member 70.

Once the tip or coupling portion 82 of the cleat 14 has been inserted into one of the cleat clamping members 70 of one of the cleat engagement mechanisms 24 or 26, the rider steps down onto pedal body 22 to apply a downward force on the pedal 10. As a result, tread cage 28 is deformed or deflected relative to pedal body 22 such that the tread surface 38a at the two ends 44 and 46 of the tread cage 28 that contact the sole of shoe 12 end up nearly parallel, as shown in FIG. 9. When the heel is pressed down further from this state, the rear end of the cleat 14 rotates the rear clamping member 72 backward against the biasing force of the springs 76, and the cleat 14 slides between the two clamping members 70 and 72. Once the cleat 14 has slid between the two clamping members 70 and 72, the rear clamping member 72 is biased by the spring 76 back to its original position wherein a tongue of cleat clamping members 72 hits against a rotation stopper of cleat clamping member 72. As a result, the cleat 14 is engaged between the two clamping members 70 and 72. Tension adjusting mechanisms 78 can be adjusted to vary the force required for engaging and releasing the shoe cleat 14 from the step-in p pedal body 22. The tread cage 28 is biased against the sole of shoe 12 due to the biasing force of the material of tread cage 28.

When the cleat 14 is engaged in the two cleat clamping members 70 and 72, the cage 28 is biased forward with respect to the pedal body 22, the shoe sole comes into contact with one of the end sections 44 and 46 of cage 28. Moreover, the side sections 40 and 42 of cage 28 are located adjacent to or contacting the sole of shoe 12. As a result, the shoe sole is stabilized relative to the pedal 10. Specifically, the shoe 12 resists leaning to the left or right by side sections 40 and 42 of cage 28, and the pedaling force is transmitted efficiently to the pedal 10. Thus, cage 28 provides a relatively wide tread surfaces 38a and 38b around the pedal body 22 to support the riders foot.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal comprising:
a pedal spindle having a center longitudinal axis of rotation;
a pedal body rotatably coupled to said pedal spindle, said pedal body having a first cleat engagement mechanism coupled to a first side of said pedal body to form a first cleat receiving area, said first cleat engagement mechanism being movably coupled to said pedal body, said first cleat engagement mechanism including a clamping member that is movable from a clamping position back to said clamping position; and
a tread cage fixedly coupled to said pedal body to rotate therewith about said pedal spindle, said tread cage having a first tread surface located on said first side of said pedal body,
said tread cage being at least partially constructed of a resilient material to selectively deform to provide angular deflection of a portion of said tread cage relative to said pedal body about said center longitudinal axis of rotation, said first tread surface of said tread cage being arranged relative to said first side of said pedal body in a first position prior to said angular deflection of said portion of said tread cage relative to said pedal body and said first tread surface of said tread cage being arranged relative to said first side of said pedal body in a second position after said angular deflection of said portion of said tread cage relative to said pedal body,
said first tread surface of said tread cage being arranged relative to said first cleat engagement mechanism such that said first tread surface of said tread cage is elastically deformed in an angular direction relative to said center axis of rotation and said clamping member of said first cleat engagement mechanism moves relative to said pedal body during an engagement process of said first cleat engagement mechanism,
said clamping member being arranged and configured relative to said tread cage to move from said clamping position without elastically deforming said tread cage.

2. A bicycle pedal according to claim 1, wherein said tread cage is at least partially formed of a rubber material.

3. A bicycle pedal according to claim 1, wherein said tread cage surrounds said pedal body to form said first tread surface as a continuous surface.

4. A bicycle pedal according to claim 1, wherein said tread cage has a second tread surface facing in a direction substantially opposite to said first side of said pedal body, and
said pedal body has a second cleat engagement mechanism coupled to a second side of said pedal body which faces in a direction substantially opposite to said first side of said pedal body.

5. A bicycle pedal according to claim 4, wherein each of said first and second cleat engagement mechanisms includes a front clamping member and a rear clamping member with at least one of said front and rear clamping members of each of said first and second cleat engagement mechanisms being movably coupled relative to said pedal body.

6. A bicycle pedal according to claim 5, wherein said tread cage surrounds said pedal body to form said first and second tread surfaces as continuous surfaces.

7. A bicycle pedal according to claim 6, wherein at least a portion of said tread cage is formed of a rubber material.

8. A bicycle pedal according to claim 1, wherein said pedal spindle has a first bicycle crank attachment end and a second cyclist's foot supporting end.

9. A bicycle pedal according to claim 1, wherein said tread surface being at least partially located to overlie a portion of said first cleat receiving area of said first cleat engagement mechanism as viewed in a direction parallel to said center longitudinal axis of rotation such that said tread cage must be elastically deformed to operatively engage said first cleat engagement mechanism.

10. A bicycle pedal according to claim 1, wherein said first cleat engagement mechanism includes a front clamping member and a rear clamping member defining said first cleat receiving area with at least one of said front and rear clamping members being movably coupled relative to said pedal body.

11. A bicycle pedal according to claim 10, wherein
said front clamping member is unobstructed by said first tread surface as viewed in a direction parallel to said center longitudinal axis of rotation.

12. A bicycle pedal according to claim 11, wherein
said first tread surface at least partially obstructs said rear clamping member as viewed in a direction parallel to said center longitudinal axis of rotation to require said tread cage to be elastically deformed to operatively engage said rear clamping member.

13. A bicycle pedal according to claim 10, wherein
said first tread surface at least partially obstructs said rear clamping member as viewed in a direction parallel to said center longitudinal axis of rotation to require said tread cage to be elastically deformed to operatively engage said rear clamping member.

14. A bicycle pedal comprising:
a pedal spindle having a center longitudinal axis of rotation;
a pedal body rotatably coupled to said pedal spindle, said pedal body having a first cleat engagement mechanism coupled to a first side of said pedal body to form a first cleat receiving area, said first cleat engagement mechanism being movably coupled to said pedal body; and
a tread cage fixedly coupled to said pedal body to rotate therewith about said pedal spindle, said tread cage having a first tread surface located on said first side of said pedal body, said tread cage being non-rotatably coupled to said pedal body by a bolt and a nut that are located along said center longitudinal axis of rotation,
said tread cage being at least partially constructed of a resilient material to selectively deform to provide angular deflection of a portion of said tread cage relative to said pedal body about said center longitudinal axis of rotation, said first tread surface of said tread cage being arranged relative to said first side of said pedal body in a first position prior to said angular deflection of said portion of said tread cage relative to said pedal body and said first tread surface of said tread cage being arranged relative to said first side of said pedal body in a second position after said angular deflection of said portion of said tread cage relative to said pedal body,
said first tread surface of said tread cage being arranged relative to said first cleat engagement mechanism such that said first tread surface of said tread cage is elastically deformed in an angular direction relative to said center axis of rotation and said first cleat engagement mechanism moves relative to said pedal body during an engagement process of said first cleat engagement mechanism.

15. A bicycle pedal according to claim 14, wherein
said nut has a portion with a non-circular cross-section that is located in a correspondingly shaped opening in said tread cage.

16. A bicycle pedal comprising:
a pedal spindle having a center longitudinal axis of rotation;
a pedal body rotatably coupled to said pedal spindle, said pedal body having a first cleat engagement mechanism coupled to a first side of said pedal body to form a first cleat receiving area, said first cleat engagement mechanism being movably coupled to said pedal body; and
a tread cage fixedly coupled to said pedal body to rotate therewith about said pedal spindle, said tread cage having a first tread surface located on said first side of said pedal body,
said tread cage being at least partially constructed of a resilient material to selectively deform to provide angular deflection of a portion of said tread cage relative to said pedal body about said center longitudinal axis of rotation,
said tread cage being arranged relative to said first engagement mechanism such that said tread cage is elastically deformed with said portion of said tread cage being deflected in an angular direction relative to said center axis of rotation at least approximately 5° as measured about said center longitudinal axis of rotation to operatively and completely engage said first engagement mechanism.

17. A bicycle pedal comprising:
a pedal spindle having a center longitudinal axis of rotation;
a pedal body rotatably coupled to said pedal spindle, said pedal body having a first cleat engagement mechanism coupled to a first side of said pedal body to form a first cleat receiving area, said first cleat engagement mechanism being movably coupled to said pedal body; and
a tread cage fixedly coupled to said pedal body to rotate therewith about said pedal spindle, said tread cage having a first tread surface located on said first side of said pedal body,
said tread cage being at least partially constructed of a resilient material to selectively deform to provide angular deflection of a portion of said tread cage relative to said pedal body about said center longitudinal axis of rotation,
said tread cage being arranged relative to said first engagement mechanism such that said tread cage is elastically deformed with said portion of said tread cage being deflected in an angular direction relative to said center axis of rotation approximately 12.5° as measured about said center longitudinal axis of rotation to operatively and completely engage said first engagement mechanism.

* * * * *